(12) United States Patent
Michaud-Lariviere

(10) Patent No.: US 12,716,399 B1
(45) Date of Patent: Aug. 25, 2026

(54) ROTOR SYSTEM

(71) Applicant: WATTMAKERS INC., San Francisco, CA (US)

(72) Inventor: Jérôme François Marie Michaud-Lariviere, Paris (FR)

(73) Assignee: WATTMAKERS INC., San Francisco, CA (US)

( * ) Notice: Subject to any disclaimer, the term of this patent is extended or adjusted under 35 U.S.C. 154(b) by 0 days.

(21) Appl. No.: 19/060,081

(22) Filed: Feb. 21, 2025

(51) Int. Cl.
*F03D 3/06* (2006.01)
*B64C 11/00* (2006.01)
*B64C 23/00* (2006.01)
*F03D 9/25* (2016.01)
*F04D 29/26* (2006.01)

(52) U.S. Cl.
CPC ................. *F03D 3/06* (2013.01); *F03D 9/25* (2016.05); *B64C 11/00* (2013.01); *B64C 23/005* (2013.01); *F04D 29/26* (2013.01)

(58) Field of Classification Search
CPC .............................. F04D 29/26; B64C 23/005
See application file for complete search history.

(56) References Cited

U.S. PATENT DOCUMENTS 8,091,836 B2 * 1/2012 Minick .................. B64C 11/18 244/1 N
11,795,912 B2 10/2023 Tanaka et al.
11,863,040 B2 * 1/2024 Ieta ........................ H02K 99/20
2002/0050719 A1 * 5/2002 Caddell ..................... F02K 7/12 290/54
2009/0159754 A1 6/2009 Minick
2015/0232172 A1 * 8/2015 Morris .................... B64C 21/00 244/205

FOREIGN PATENT DOCUMENTS

EP 3026261 A1 6/2016
WO 2004090346 A1 10/2004
WO WO-2019197871 A1 * 10/2019 ............ F03D 3/005

OTHER PUBLICATIONS

Laid Khettache, "Contribution à l'Amélioration des Performances Des Systèmes Eoliens", Doctoral thesis, Universite Mohamed Khider Biskra (2019).
Wen Xu et al., "Aerodynamic performance improvement analysis of Savonius Vertical Axis Wind Turbine utilizing plasma excitation flow control", Energy, vol. 239, Part D, 122133 (Jan. 15, 2022).
Lu Qu et al., "Simulation Study on Positive Corona Discharge of Receptors on Rotating Wind Turbine Blade Tips under Thunder-cloud Electric Fields", Energies 2019, 12(24), 4696 (published Dec. 10, 2019).

(Continued)

*Primary Examiner* — Nathaniel E Wiehe
*Assistant Examiner* — Jason G Davis
(74) *Attorney, Agent, or Firm* — Weitzman Law Offices, LLC

(57) ABSTRACT

A rotor system comprising at least a rotor adapted to rotate with respect to a stator, the rotor system further comprising a densifier adapted to densify gas of an upstream volume by an average density rise of at least about 1%, wherein the cross-section area of the volume is the rotor sweeping area and the depth of the volume is at least about one millimeter.

15 Claims, 10 Drawing Sheets

(56) References Cited

OTHER PUBLICATIONS

S. Abed Zahmatkesh Pasand, "Numerical Study of the Effect of Corona Discharge on Upward Wake Flow in the Horizontal Axis Wind Turbine Farm", Journal of Applied Fluid Mechanics, vol. 18, No. 1, pp. 32-44 (2025).

David Greenblatt et al., "Vertical axis wind turbine performance enhancement using plasma actuators", Renewable Energy, vol. 37, Issue 1, pp. 345-354 (Jan. 2012).

* cited by examiner

ROTOR SYSTEM

FIELD

This disclosure relates to the field of rotors.

BACKGROUND

This disclosure will be primarily described in the context of wind turbines. However, other applications are possible, such as will be presented below. Wind turbines are an increasingly popular way to generate energy, and in particular to generate electricity. Considerable research efforts are placed to increase the energy outputs of such wind turbines.

SUMMARY

This disclosure relates to a rotor system for a wind turbine comprising at least a rotor adapted to rotate with respect to a stator, the rotor system further comprising a densifier adapted to densify air of an upstream volume by an average density rise of at least 1%, wherein the cross-section area of the volume is the rotor sweeping area and the depth of the volume is at least one millimeter. Raising the density of the air flowing through the turbine resulted in an increased power output of the wind turbine. Without willing to be bound by theory, the inventor believes that incoming kinetic power on the turbine can be written as $P_c=\frac{1}{2}\rho S v^3$, where ρ is the average air density, S is the swept surface, and v the wind speed, and that the increase of incoming power is directly proportional to the increase in upstream air density. The use of densifiers according to this disclosure thus appears to be an efficient way of raising the output of the wind turbine.

According to one embodiment, a rotor system is disclosed, wherein the densifier comprises at least one ionizer adapted to ionize air of the upstream volume.

According to one embodiment, a rotor system is disclosed, wherein the at least one ionizer comprises at least one effective end located in the upstream volume.

According to one embodiment, a rotor system is disclosed, wherein said at least one effective end comprises at least a first electrode and a second electrode spaced apart from the first electrode, and wherein the ionizer comprises an electrical generator adapted to generate a voltage difference between the first electrode and the second electrode.

According to one embodiment, the at least one effective end is provided on the rotor.

According to one embodiment, the rotor comprises a plurality of blades, and the at least one effective end is provided on a blade.

According to one embodiment, the rotor is adapted to rotate with respect to the stator about a vertical axis.

According to one embodiment, the densifier is adapted to densify air of an upstream volume by an average density rise of at least about 10%.

According to one embodiment, the depth of the volume is at least about ten millimeters.

According to an aspect, a turbine is disclosed, comprising a rotor system, and further comprising a stator.

According to an aspect, a wind turbine system is disclosed, comprising such a rotor system.

According to an aspect, a rotor system is disclosed, comprising at least a rotor adapted to rotate with respect to a stator, the rotor system further comprising a densifier adapted to densify gas of an upstream volume by an average density rise of at least about 1%, wherein the cross-section area of the volume is the rotor sweeping area and the depth of the volume is at least about one millimeter.

According to an aspect, a rotor system is disclosed, wherein the gas is air.

According to an aspect, an airplane turbine is disclosed, comprising this rotor system.

According to an aspect, an air fan is disclosed, comprising this rotor system.

DETAILED DESCRIPTION OF THE INVENTION

In this disclosure where gravity plays a role, "vertical" is used to designate the direction passing through the center of the Earth. "Horizontal" is used to designate the plane normal to the "vertical" direction. Words like "up", "down", "high", "low", "above", "below", etc. are used with respect to the vertical direction.

The present description is provided assuming the ground is horizontal. This disclosure would however be applicable everywhere, even if the ground is not strictly speaking horizontal. Wind is a flow of air which is typically parallel to the horizontal. This disclosure remains applicable when wind flows not strictly speaking horizontally, for example due to the shape of the ground, due to obstacles to flow such as trees, buildings or else, or for other reasons.

This disclosure is applicable to any kind of wind turbine. Although this disclosure will be described below according to a plurality of embodiments, it is to be kept in mind that, according to the disclosure, a densifier is used to increase the average density of the air in the vicinity of the wind turbine. Without wishing to be bound by theory, for a given incoming wind speed v, and for a given wind turbine of swept area S, it is believed that the kinetic power $P_c$ of the incoming wind can be written $$P_c = 1/2\ \rho\ S\ v^3,$$

where ρ is the average air density of the considered air volume. Increasing the average air density thereby linearly increases the kinetic power which is transformed into power of an alternative form, in particular electricity, at the wind turbine. The description below will detail, for a number of examples of wind turbines, various ways of providing air densification. However, these are merely examples of the above described concept.

Figure 1:
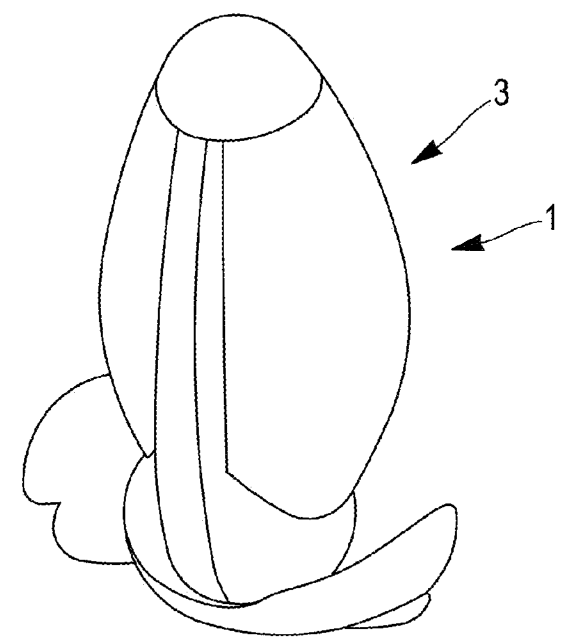
FIG. 1 is a three-dimensional top perspective view of a wind turbine according to one embodiment.

FIG. 1 schematically represents an embodiment of a wind turbine 1 according to one embodiment of this disclosure. A wind turbine 1 comprises a stator 2 and a rotor 3. The rotor 3 is mounted to rotate with respect to the stator 2 about a fixed rotation axis (Zr, see FIG. 4). This disclosure is applicable to so-called "vertical axis" wind turbines. A "vertical axis" wind turbine is a wind turbine designed to be used with its rotation axis Zr extending along the vertical direction. In the following description, it will be assumed that the wind turbine 1 is placed so that its rotation axis Zr extends vertically. Of course, the same turbine may be oriented differently.

The rotation axis is central for the rotor 3.

Figure 2:
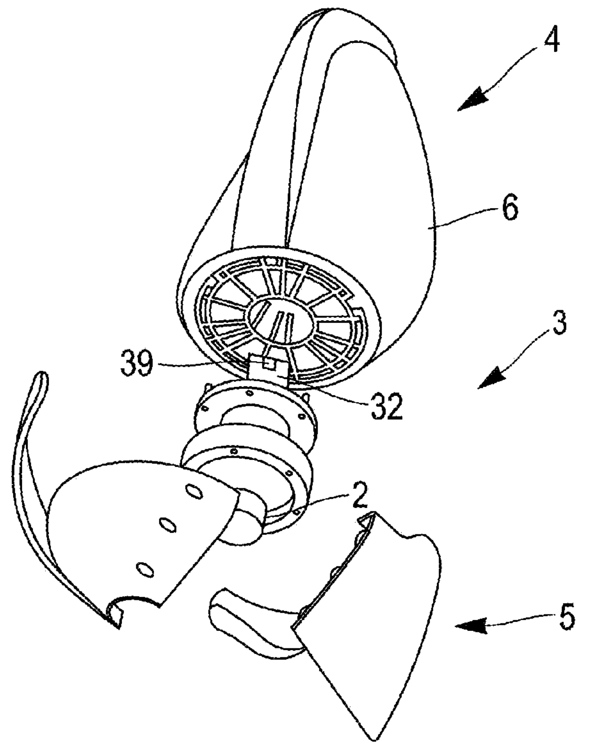
FIG. 2 is an exploded bottom perspective view of the wind turbine of FIG. 1.

As can be seen on FIG. 2, the rotor 3 comprises a narrow blade portion 4 and a wide blade portion 5. The narrow blade portion 4 and the wide blade portion 5 are spaced from one another along the vertical axis. In the presented embodiment, the narrow blade portion 4 is located above the wide blade portion 5.

The narrow blade portion 4 is narrower than the wide blade portion 5. The width of the blade portions is measured as the maximal horizontal distance between the rotation axis and any point of the respective blade portion.

As can also be seen in FIG. 1, the narrow blade portion 4 is higher than the wide blade portion 5. The height of the blade portions is measured as the maximal vertical distance between any two points of the respective blade portion.

The narrow blade portion 4 has a plurality of blades 6. The blades of the narrow blade portion 4 are called "narrow blades" 6. These narrow blades 6 are equally distributed about the rotation axis. Further, the narrow blades 6 are identical to one another. This ensures a homogeneous transformation of wind energy to electrical energy. In the present example, there are three identical narrow blades 6 which form angles of 120° two by two about the rotation axis. Therefore, below, the description of a single narrow blade 6 will be provided, and this description will be applicable to the other narrow blades.

Below, we will describe one horizontal section of a narrow blade 6, with reference to FIG. 3. The rotor is designed to rotate in the clockwise direction on FIG. 3. The section comprises a proximal portion 7 and a distal portion 8. The words "proximal" and "distal" are used by reference to the central rotation axis.

The narrow blade 6 is a thin shell shaped to receive incoming wind. The shape comprises a curvature in the horizontal plane, as can be seen in FIG. 3. As can be seen on the other figures, the shape may also comprise a curvature in a vertically secant plane. So, overall, the narrow blade 6 defines a cavity 50. The narrow blade 6 comprises a concave front face 9 and an opposed convex back face 10. The front and back faces 9 and 10 are approximately parallel to one another. The thickness of the narrow blade 6 is approximately constant, from the proximal portion 7 to the distal portion 8. This thickness, also called "main thickness", is for example comprised between about 1.5 millimeters (mm) and about 5 mm, for example between about 2.5 mm and about 3.5 mm. This thickness of a suitable material allows supporting the imparting energy of wind with a minimum inertia. The distal portion 8 may have a continuously decreasing thickness from the connection to the proximal portion 7 to the edge 11. The thickness at the edge, also called "edge thickness", is for example not lower than about 0.5 mm, notably not lower than about 1.5 mm. This thickness allows sufficient strength of the edge. The ratio of the main thickness to the edge thickness is for example between about 1.5 and about 10, for example between about 2.5 and about 3.5. This allows manufacturability, strength, low inertia and low drag coefficient Cx of the blade.

Figure 3:
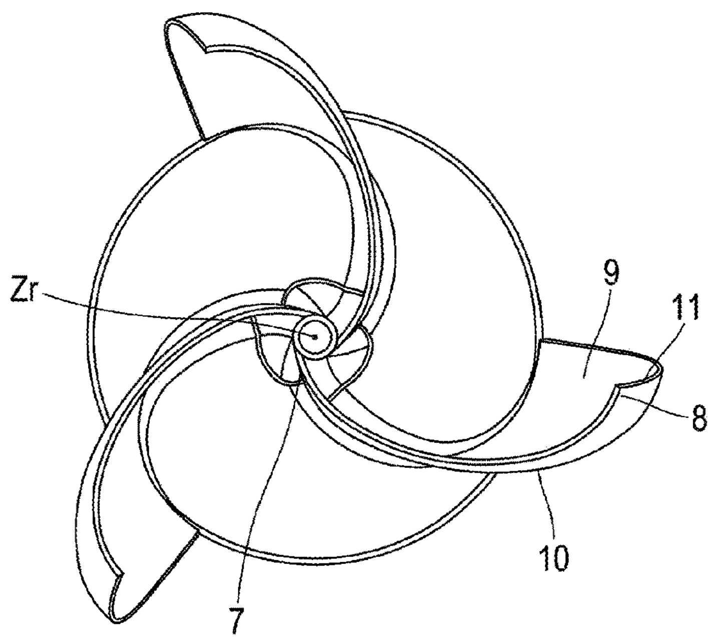
FIG. 3 is a top sectional view of the narrow blade portion of the wind turbine of FIG. 1.

As can be seen also from FIG. 3, the rotation axis Z, is disposed approximately between the proximal end of the proximal portion 7 and the distal portion 8.

Along the vertical axis, the narrow blade 6 extends from a bottom portion 12 to a top portion 13. The bottom portion 12 is connected to a base 14 along its whole width. The top portion 13 is connected to a top 15 along its whole width. These two connections ensure a firm holding of the narrow blade 9 within the rotor 3.

Along the vertical axis, the edge 11 is also continuously curved. The location with the maximal lateral extension is between the bottom portion 12 and the top portion 13. More precisely, this location is closer to the bottom portion 12 than to the top portion 13, measured along the vertical axis. For example, the distance between the bottom portion 12 and the location with the maximal lateral extension of the narrow blade 6, along the vertical axis, is between about ⅕ and about ⅓ of the height of the narrow blade 6, along the vertical axis. The tapering shape of the narrow blade portion 4 allows to reduce the moments of force applied to the assembly of the wind turbine to its support.

The top 15 may comprise a continuous structure 16 which is connected to the top portions 13 of all narrow blades 6, for example a flat plate. The top 15 may further comprise an outer dome 17 which is connected to the continuous structure 16 and overlies it. The dome 17 strengthens the rotor 3 and provides a rounded top shape which is harmless in case of contacts and enables the rotor to look like a tree leaf.

The base 14 may be conically shaped pointing upward, with the rotation axis Z, as cone axis. This shape enables to provide space to house other components, such as will be described below. Further, this geometry strengthens the connection of the narrow blade portion 4 with the underlying elements which will be described below.

According to one embodiment, the narrow blade portion 4 which has been described above is single-piece. This enables to get rid of mechanical connection devices which allow play between components, and are subject to vibration. For example, the narrow blade portion 4 is manufactured by additive manufacturing. This additive manufacturing technology allows to manufacture a single piece with such a complex shape as that of the narrow blade portion 4. In such case, the narrow blade portion 4 is made of a suitable additive manufacturing material, such as polylactic acid ("PLA") or acrylonitrile butadiene styrene ("ABS") or the like. One may chose a biodegradable, non-toxic, rigid, strong and/or sustainable material. So, when, in the description above, it is mentioned that two parts, sections or portions, are "connected", it should be understood that they are formed of an integral single-piece of material under this embodiment. Additive manufacturing enables to obtain a thin blade with good mechanical strength, which lowers weight, inertia and cost of manufacturing with respect to thicker blades.

In addition, by reducing the mechanical fastenings, less energy is dissipated as mechanical energy at such fastenings, and the risk of loosening of attachments is reduced. Loosened attachments may cause dynamic stresses and fatigue to the wind turbine. Providing the narrow blade portion 4 as a single piece thus enables to increase the life expectancy of the wind turbine 1, and to maintain a high ratio of energy conversion along time. However, the narrow blade portion 4 may alternatively be made of a plurality of components attached to one another. For example, the narrow blade portion 4 is made of a plurality of narrow blade portion components which are assembled to one another by any suitable means, notably screwing, bolting, crimping or snap-fastening. The components may be made of a material constituted from a blend of polymers. For example, the material may comprise a blend of polystyrene with polyphenylene oxides or polyphenylene ether, such as available under the trademark NORYL™ at the priority date of the present document. As described here, the blade components are made of an electrically insulating material. Alternatively, the blade components are made of an electrically conducting material such as aluminum. In that case, the below-described electrodes are kept electrically insulated from the constituting material of the blade components. According to one example, all narrow blade portion components are identical, which enables to reduce the number of molds necessary for the production of the narrow blade portion. Each narrow blade portion component may comprise one single narrow blade 6, a portion of the bottom portion 12 and a portion of the top portion 13. For example, the narrow blade portion is made of three identical narrow blade portion components which are assembled to one another.

Figure 5:
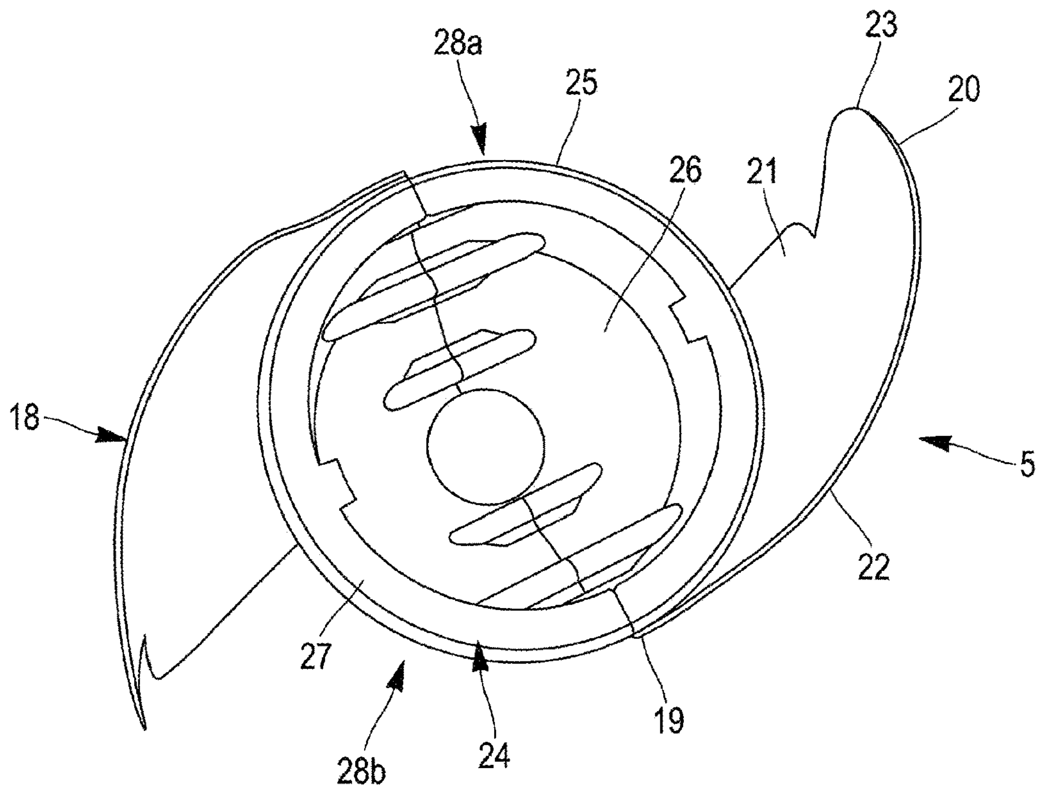
FIG. 5 is a top view of the wide blade portion of the wind turbine of FIG. 1.

As can be seen on FIG. 5, the rotor 3 further comprises the wide blade portion 5.

The wide blade portion 5 is wider than the narrow blade portion 4. For example, the maximal lateral extension of the wide blade portion 5 is at least about 1.5 times the maximal lateral extension of the narrow blade portion 4. Notably, the ratio of the maximal lateral extension of the wide blade portion 5 to the maximal lateral extension of the narrow blade portion 4 is at least equal to about 1.6, preferably at least equal to about 1.7, more preferably at least equal to about 1.8, even more preferably at least equal to about 1.9, or even more preferably at least equal to about 2. The wide blade portion 5 thus acts as a starting propeller, adapted to enable the wind turbine to start rotating even by slow winds. Using such a configuration enables the wind turbine to start rotating even by slower winds than using narrower blades.

According to some embodiments, the ratio of the maximal lateral extension of the wide blade portion 5 to the maximal lateral extension of the narrow blade portion 4 is less than about 2.5, notably less than about 2.4, more notably less than about 2.3, even more notably less than about 2.2, or even less than about 2.

According to some embodiments, the diameter of the circle circumventing the wide blade portion 5, and hence the wind turbine 1, is comprised between about 0.5 meters (m) and about 1 m, preferably between about 0.65 m and about 0.7 m.

As can also be seen on FIG. 1, the wide blade portion 5 is shorter than the narrow blade portion 4, as measured along the vertical axis. For example, the maximal height of the narrow blade portion 4 is at least about 1.5 times the maximal height of the wide blade portion 5. Notably, the ratio of the maximal height of the narrow blade portion 4 to the maximal height of the wide blade portion 5 is at least equal to about 1.6, more notably at least equal to about 1.7, even more notably at least equal to about 1.8, even more notably at least equal to about 1.9, or at least equal to about 2.

According to some embodiments, the ratio of the maximal height of the narrow blade portion 4 to the maximal height of the wide blade portion 5 is less than about 3.5, notably less than about 3 or even less than about 2.5.

According to some embodiments, the height of the wind turbine 1 along the vertical axis, is comprised between about 0.7 m and about 1.5 m, preferably between about 1.0 m and about 1.2 m.

The wide blade portion 5 has a plurality of blades 18. The blades of the wide blade portion 5 are called "wide blades" 18. These wide blades 18 are equally distributed about the rotation axis. Further, the wide blades 18 are substantially identical to one another. This ensures a homogeneous transformation of wind energy to electrical energy.

According to one embodiment, the number of wide blades 18 is identical to the number of narrow blades 6. In such an embodiment, narrow blades 6 and wide blades 18 may be aligned with one another two by two. According to a variant, the wide blades 18 are rotationally offset with respect to the narrow blades 6 about the rotation axis. The offset is for example about half of the angle between two following narrow blades 6.

According to another embodiment, the number of wide blades 18 is different from the number of narrow blades 6. For example, the difference between the number of wide blades 18 and the number of narrow blades 6 is equal to about 1. According to another example, it is equal to about 2. For example, it is less than about 6, notably less than about 4.

In the present example, there are two substantially identical wide blades 18 which form an angle of about 180° with one another about the rotation axis. In addition, no wide blade 18 is aligned with a corresponding narrow blade along the vertical axis. The angle between a narrow blade 6 and a wide blade 18 is at least about 30°.

Below, the description of a single wide blade 18 will be provided, and this description will be applicable to the other wide blade(s) 18.

Below, we will describe one wide blade 18, with reference to FIG. 5. The wide blade 18 comprises a proximal portion 19 and a distal portion 20. The words "proximal" and "distal" are used by reference to the central rotation axis.

The wide blade 18 is a thin shell shaped to receive incoming wind. The shape comprises a curvature in the horizontal plane, as can be seen in FIG. 5. As can be seen on the other figures, the shape may also comprise a curvature in a vertically secant plane. The wide blade 18 comprises a concave front face 21 and an opposed convex back face 22. With respect to the rotation axis, the concavity of the wide blade 18 is the same as that of narrow blade 6. The front and back faces 21 and 22 are approximately parallel to one another. The thickness of the wide blade 18 is substantially constant, from the proximal portion 19 to the distal portion 20. For example, this thickness, also called "main thickness" is the same as that of the narrow blade 6. This thickness allows supporting the imparting energy of wind with a minimum inertia. The distal portion 20 may have a continuously decreasing thickness from the connection to the proximal portion 19 to the edge 23. In other words, the thickness continuously increases, starting from the edge. The thickness at the edge, also called "edge thickness", is for example not lower than about 0.5 mm. For example, it is the same as for the narrow blade 6. This thickness allows sufficient strength of the edge. The ratio of the main thickness to the edge thickness is for example between about 1.5 and about 10. For example, it is the same as for the narrow blade 6. This allows manufacturability, strength, low inertia and low drag coefficient Cx of the blade.

According to one embodiment, the wide blade portion 5 comprises a bottom housing 24 from which the wide blades 18 extend. The bottom housing 24 is for example cup-shaped, with a narrow bottom and a large upper opening 26. The cup is for example partly spherical, or partly cylindrical of revolution. The bottom housing 24 has a shell 27 from which the wide blades 18 extend radially outward. The wide blade 18 extends above the top plane of the bottom housing 24.

For example, the wide blade portion is made of a plurality of wide blade portion components which are assembled to one another by any suitable means, notably screwing, bolting, crimping or snap-fastening. According to one example, all wide blade portion components are identical, which enables to reduce the number of molds necessary for the production of the wide blade portion. Each wide blade portion component may comprise one single wide blade 18 and a portion of the bottom housing 24. For example, as shown on FIG. 5, the wide blade portion is made of two identical wide blade portion components 28*a* and 28*b* which are assembled to one another. Reference "28" is used to generally designate one of these wide blade portion components.

According to one embodiment, each of the wide blade portion components 28 which has been described above is single-piece. This enables to get rid of mechanical connection devices which allow play between components, and are subject to vibration. For example, the wide blade portion component 28 is manufactured by additive manufacturing. This additive manufacturing technology allows to manufacture a single piece with such a complex shape as that of the wide blade portion component 28. In such case, the blade components 28 is made of a suitable additive manufacturing material, such as polylactic acid ("PLA") or acrylonitrile butadiene styrene ("ABS") or the like. One may chose a biodegradable, non-toxic, rigid, strong and/or sustainable material. Possibly, one will use the same material as that of the narrow blade portion 4, in order to obtain similar mechanical properties. So, when, in the description above, it is mentioned that two parts, sections or portions, are "connected", it should be understood that they are formed of an integral single-piece of material under this embodiment. According to an embodiment, the material constituting the wide blade portion component 28 is the same as that constituting the narrow blade portion 4.

The narrow blade portion 4 and the wide blade portion 5 are fixedly assembled to one another by any suitable means, such as screwing, bolting, crimping, snap-fastening, or the like. Preferably, the assembly may be undone using suitable tools, for example for maintenance. However, alternatively, one may provide for individual components which each include part of the narrow blade portion and part of the wide blade portion, and these individual components are assembled to one another.

Figure 6:
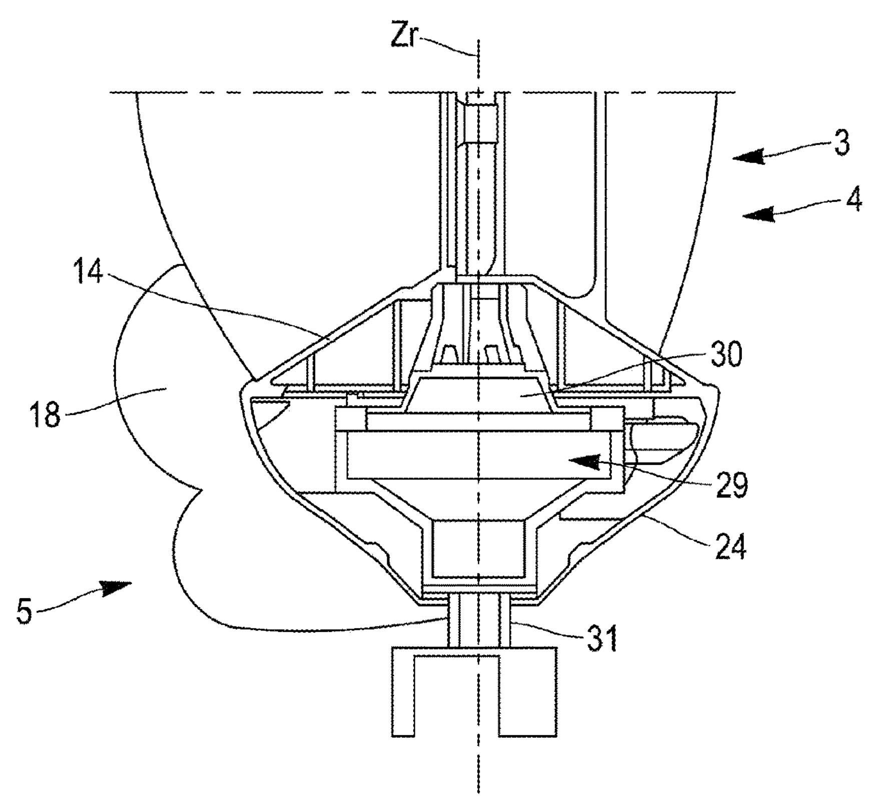
FIG. 6 is a partial front sectional view of the wind turbine of FIG. 1.

The wind turbine 1 further comprises an electrical generator 29, such as shown on FIG. 6. The electrical generator 29 comprises a generator rotor 30 and a generator stator 31. The generator rotor 30 is designed to rotate with respect to the generator stator 31 about a rotation axis. When the electrical generator 29 is assembled within the wind turbine, this rotation axis is the rotation axis Zr. The generator rotor 30 is assembled to the rotor 3 of the wind turbine 1. In particular, as shown on FIG. 6, the electrical generator 29 is housed within the wide blade portion 5, notably in the bottom housing 24, and attached thereto and/or to the base 14 of the narrow blade portion 4 by any suitable means.

According to one embodiment, the generator rotor 30 may comprise a plurality of permanent magnets with alternated polarity, and the generator stator 31 has electrical coils intended to interact with the permanent magnets of the generator rotor 30, so that rotation of the rotor 3 generates an alternating electrical field at the generator stator 31.

The wind turbine 1 further comprises an electronical circuit 32. The electronical circuit 32 comprises a microprocessor 39 adapted to regulate the electrical current outputted from the wind turbine 1. For example, the electrical current generated by the wind turbine 1 is a 3-phase 48V alternating current.

According to some embodiments, a redresser (not shown) of the electronical circuit 32 may redress the alternating current to a DC current.

According to an embodiment, the wind turbine comprises a densifier 51 adapted to densify air. In particular, an upstream volume of air is densified by the densifier 51. By densified, it means that the average density of the volume of air is raised when compared to the average density of the volume of air without using the densifier. In other words, the density is raised when compared to the density of air upstream and further away from the wind turbine. For example, the average density is raised by at least about 1%, by at least about 2%, by at least about 3%, by at least about 5%, by at least about 10%, by at least about 15%, by at least about 20%, by at least about 25%, by at least about 30%, by at least about 40%, by at least about 50%, by at least about 60%, by at least about 75%, by at least about 90%, or even by at least about 100%.

Figure 4:
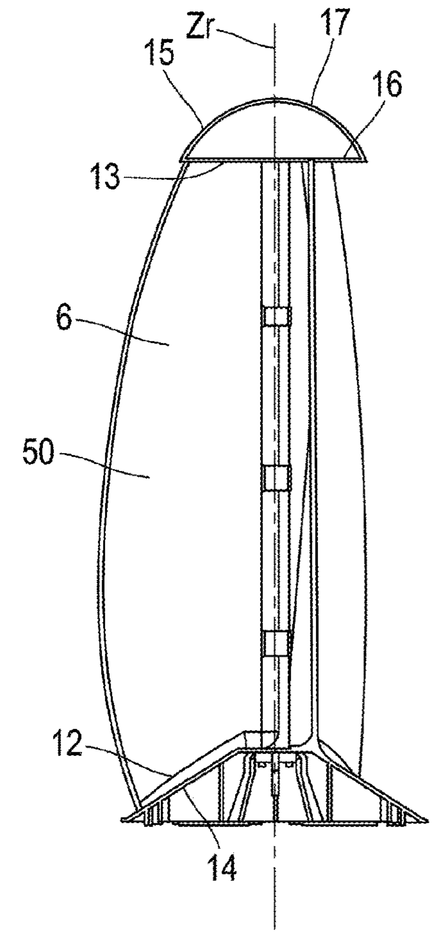
FIG. 4 is a front sectional view of the narrow blade portion of the wind turbine of FIG. 1.

The upstream volume of air is defined by the cross-section S of the rotor 3 normal to the direction of the incoming wind, as can be seen for example on FIG. 4. For example, the cross-section is at least about 0.1 square meters ($m^2$). The upstream volume of air is defined by a depth d along the direction of the incoming wind, from the plane normal to that direction and comprising the rotation axis Zr in the upstream direction, by a depth of at least about 1 millimeter, at least about 2 millimeters, at least about 3 millimeters, at least about 4 millimeters, at least about 5 millimeters, at least about 10 millimeters, at least about 15 millimeters, at least about 20 millimeters, at least about 25 millimeters, at least about 30 millimeters, at least about 40 millimeters, at least about 50 millimeters, at least about 75 millimeters, at least about 100 millimeters. For example, for a vertical axis wind turbine, the depth is at least about the radius of the rotor, even at least about twice the radius of the rotor.

Figure 11:
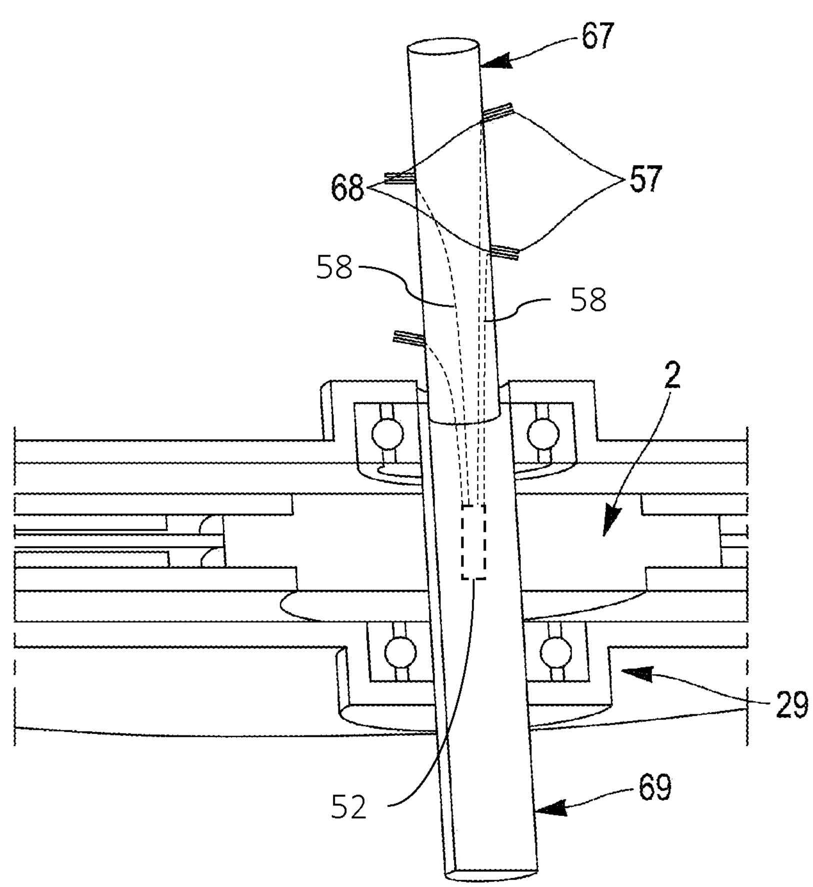
FIG. 11 is a sectional view including the central axis of the wind turbine of an embodiment.

Turning back to FIG. 8, the densifier 51 for example comprises one or more ionizers 52. One ionizer 52 will be described below, but this description is applicable to other ionizers. The ionizer 52 comprises an electrical circuit 53 comprising an electrical generator 54, and an effective end 57 comprising a first electrode 55 and a second electrode 56 (see FIG. 11), each connected to the electrical generator 54 by a suitable electrical connection such as a wire 58. The electrodes may be provided on thin pins or at the end of wires. The electrical generator 54 is alimented through a connection line 59 from the electronical circuit 32, or by internal batteries. For example, the electrical generator 54 is alimented by 12V DC. Alternatively, the electrical generator 54 may be alimented by another suitable tension in DC, or in AC. The energy consumption of the electrical generator 54 remains low compared to the energy produced by the wind turbine, and even compared to the increase of the energy produced by the wind turbine provided by using the electrical generator 54. The electrical generator 54 is designed to apply a voltage difference between the first electrode 55 and the second electrode 56. The first electrode 55 and the second electrode 56 are spaced apart with interposition of a dielectric material 60 such as the air which is to be ionized. For example, the first electrode 55 and the second electrode 56 are provided at the surface of the rotor 3. For example, the ionizer 52 is assembled to the rotor 3, so as to rotate with the rotor 3 about the stator 2. The wires 58 connecting the electrical generator 54 to the electrodes 55, 56 may run in gutters provided in the blades. The electrical generator 54 is adapted to apply a voltage difference between the first electrode 55 and the second electrode 56 so that this capacitor will discharge through a spark in the dielectric material 60 between the first electrode 55 and the second electrode 56. For example, the discharge is a corona discharge. This discharge will ionize the air molecules present between the first electrode 55 and the second electrode 56. More particularly, dinitrogen molecules will be ionized. Ions, in particular anions, will be generated. It is possible that other air molecules will be ionized as well. Without wishing to be bound by theory, it is believed that the ionized species will chemically react with one another or with other species of the air, which will locally increase the density. The kinetics of these chemical reactions will depend on the chemical composition of the air, and also of the thermodynamic conditions of the air flow (namely at least, pressure, flow, initial density and temperature). In particular, the ionizer 52 is chosen to generate, per discharge, at least about 1 million ions, at least about 2 million ions, at least about 3 million ions, at least about 4 million ions, at least about 5 millions ions, at least about 10 million ions, at least about 50 million ions, at least about 100 million ions, at least about 500 million ions, at least about 1 billion ions, at least about 10 billion ions, at least about 100 billion ions, at least about 500 billion ions, at least about 1 trillion ions, at least about 2 trillion ions, . . .

Depending on the ionizers, the ionizer is adapted to generate such a discharge at a frequency greater than about 0.1 Hz, greater than about 0.2 Hz, greater than about 0.5 Hz, greater than about 1 Hz, notably greater than about 1.5 Hz, greater than about 2 Hz, greater than about 5 Hz, greater than about 10 Hz. The discharge frequency may be parametered as a function of one or more parameters of the wind flow, such as the wind speed, wind direction, wind composition and/or turbulence. For example, the ionizer 52 comprises a processor adapted to determine the discharge frequency as a function of the wind flow parameter(s), which can be measured at the wind turbine, and/or received through communication.

For example, the ionizer 52 is chosen to generate, per second, at least about 1 million ions, at least about 2 million ions, at least about 3 million ions, at least about 4 million ions, at least about 5 million ions, at least about 10 million ions, at least about 50 million ions, at least about 100 million ions, at least about 500 million ions, at least about 1 billion ions, at least about 10 billion ions, at least about 100 billion ions, at least about 500 billion ions, at least about 1 trillion ions, at least about 2 trillion ions, . . .

For example, the ionizer 52 is chosen to generate ions so that, at about 2.9 centimeters (cm) from the electrodes, in the absence of wind, the ion density is at least about 1 million ions per cubic centimeter ($cm^3$), at least about 2 million ions per $cm^3$, at least about 3 million ions per $cm^3$, at least about 4 million ions per $cm^3$, at least about 5 million ions per $cm^3$, at least about 10 million ions per $cm^3$, at least about 50 million ions per $cm^3$, at least about 100 million ions per $cm^3$, at least about 500 million ions per $cm^3$, at least about 1 billion ions per $cm^3$, at least about 10 billion ions per $cm^3$, at least about 100 billion ions per $cm^3$, at least about 500 billion ions per $cm^3$, at least about 1 trillion ions per $cm^3$, at least about 2 trillion ions per $cm^3$.

As a function of the wind speed and direction, the density of ions at about 2.9 centimeters from the electrodes might be different.

For example, the ionizer 52 is chosen to generate ions so that, at about 2.9 centimeters (cm) from the electrodes, under the actual wind conditions, the ion density is at least about 1 million ions per cubic centimeter ($cm^3$), at least about 2 million ions per $cm^3$, at least about 3 million ions per $cm^3$, at least about 4 million ions per $cm^3$, at least about 5 million ions per $cm^3$, at least about 10 million ions per $cm^3$, at least about 50 million ions per $cm^3$, at least about 100 million ions per $cm^3$, at least about 500 million ions per $cm^3$, at least about 1 billion ions per $cm^3$, at least about 10 billion ions per $cm^3$, at least about 100 billion ions per $cm^3$, at least about 500 billion ions per $cm^3$, at least about 1 trillion ions per $cm^3$, at least about 2 trillion ions per $cm^3$.

The density of generated ions at about 2.9 centimeters from the emitter end in the absence of wind is only a way to characterize the ionizer. It does not mean that any specific phenomenon is occurring at this specific location. The density of ions in the volume surrounding the emitter end might be determined according to the physical laws ruling the physical phenomena at play, as described below. For this disclosure, the ionizers will be used in the presence of wind. In the presence of wind, the density of generated ions at about 2.9 centimeters from the emitter end will be different from the density of generated ions at about 2.9 centimeters from the emitter end in the absence of wind. The density of ions in the volume surrounding the emitter end might be determined according to the physical laws ruling the physical phenomena at play, as described below, taking into account transport of the ions by the wind. In particular, ions emitted upstream of the wind turbine will flow through the wind turbine, whereby a densified air will flow through the wind turbine.

Figure 8:
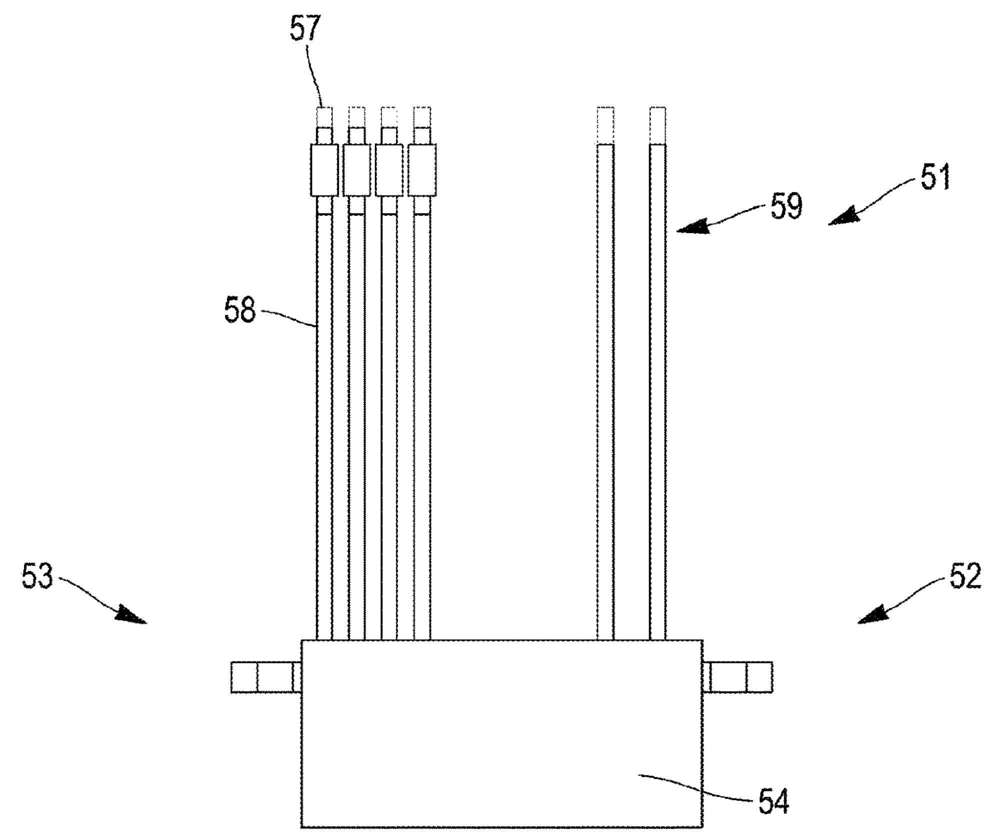
FIG. 8 is a schematic view of an ionizer.
Figure 9:
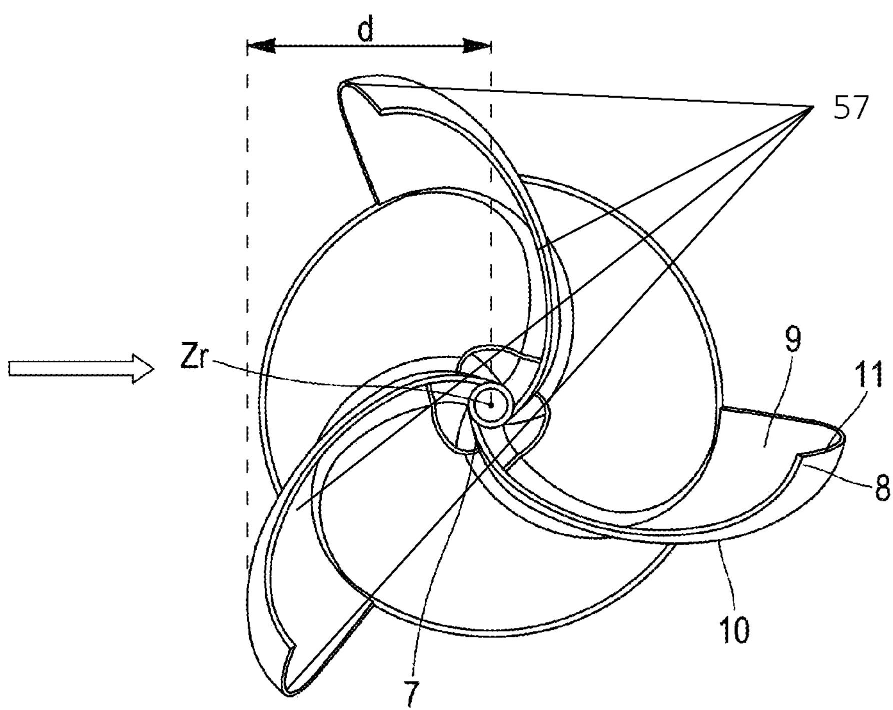
FIG. 9 corresponds to FIG. 4 with an identification of the upstream volume of air.
Figure 10:
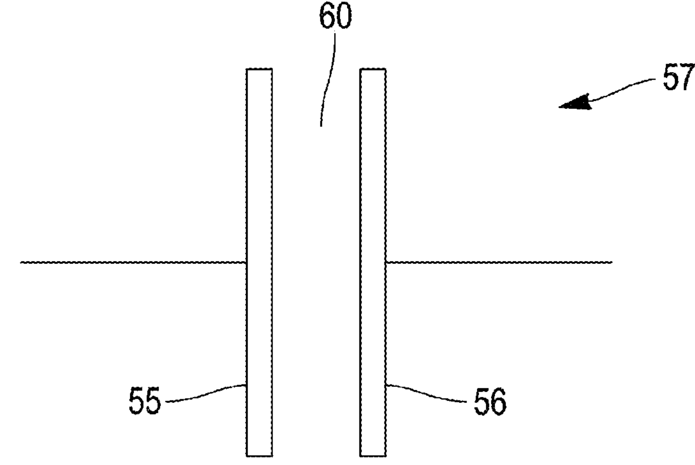
FIG. 10 is a schematic view of an effective end.

According to various embodiments, the electrical generator 54 may be wired to more than one sets of first and second electrodes, such as shown on FIG. 8. In such case, effective ends 57 may be provided spaced apart from one another on the surface of the rotor. For example, the effective ends 57 are spaced apart from one another by at least about 1 centimeter, at least about 2 centimeters, at least about 3 centimeters, at least about 4 centimeters, at least about 5 centimeters, at least about 10 centimeters, at least about 20 centimeters, at least about 50 centimeters, when applicable. Further, depending on the embodiments, the effective ends 57 are spaced apart from one another by at most one meter, at most about 60 centimeters, at most about 40 centimeters, at most about 15 centimeters, at most about 8 centimeters, at most about 5 centimeters, at most about 4 centimeters, at most about 3 centimeters, at most about 2 centimeters. For example, as shown in FIG. 9, effective ends 57 are provided in the middle of the cavities and or on the blade edges.

As mentioned above, the densifier 51 may comprise a plurality of ionizers 52. Each ionizer 52 may comprise one or more sets of electrodes. In such case, effective ends 57 may be provided spaced apart from one another on the surface of the rotor. For example, the effective ends are spaced apart from one another by at least about 1 centimeter, at least about 2 centimeters, at least about 3 centimeters, at least about 4 centimeters, at least about 5 centimeters, at least about 10 centimeters, at least about 20 centimeters, at least about 50 centimeters, when applicable. Further, depending on the embodiments, the effective ends are spaced apart from one another by at most about one meter, at most about 60 centimeters, at most about 40 centimeters, at most about 15 centimeters, at most about 8 centimeters, at most about 5 centimeters, at most about 4 centimeters, at most about 3 centimeters, at most about 2 centimeters.

If possible, the ionizers 52 are selected to limit the production of ozone, for example below about 0.1 ppm. This can be achieved for example by controlling the voltage applied to the electrical generator 54, for example below about 100 V DC, below about 80 V DC, below about 60 V DC, below about 40 V DC, or even below about 25 V DC.

Ionization of air causes a local increase of density.

Figure 13:
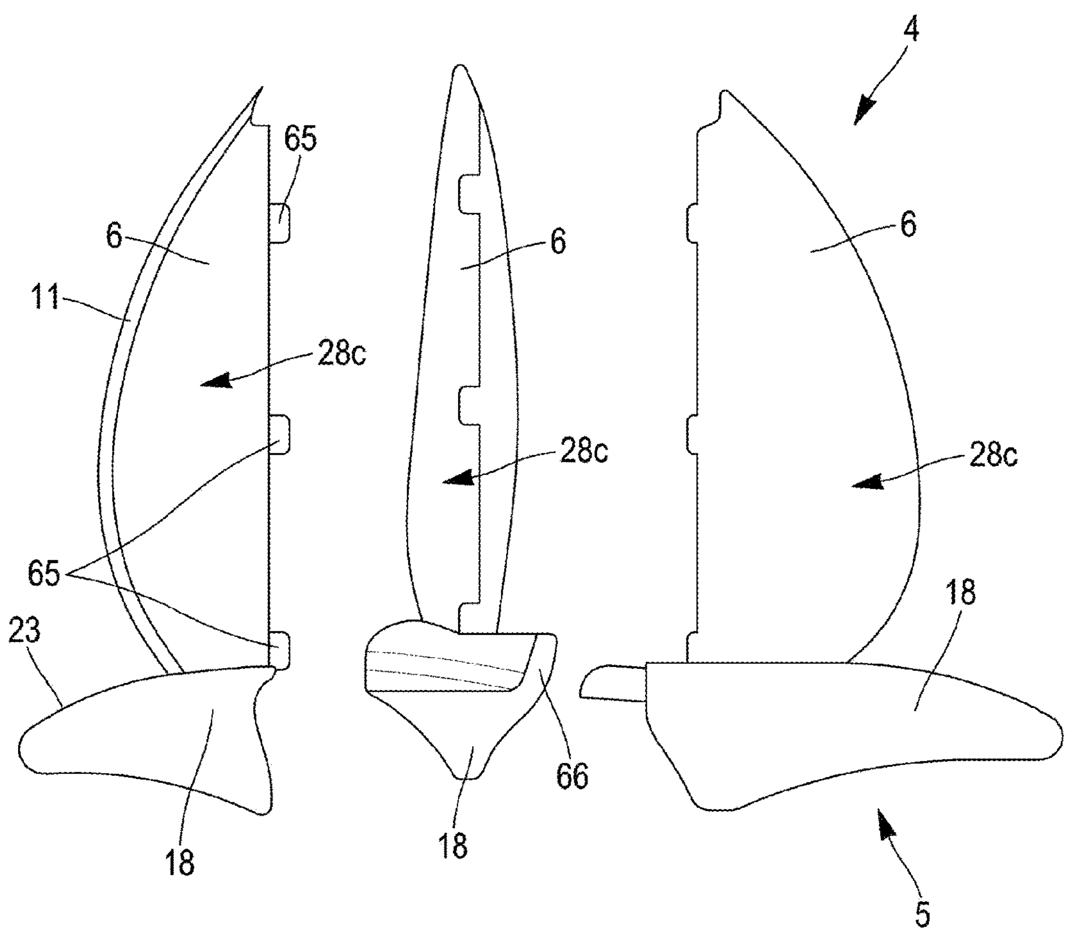
FIG. 13 is an exploded view of another embodiment.

FIG. 13 is an exploded view of the shell of another wind turbine to which this disclosure is applicable.

The wind turbine of FIG. 13 comprises a rotor 3. The rotor 3 is rotatable with respect to the stator about a vertically aligned rotational axis. The rotor 3 comprises a first blade portion, also called narrow blade portion 4, and a second blade portion, also called wide blade portion 5.

The first blade portion comprises a plurality of first blades, also called narrow blades 6, which are identical to one another and equally distributed about the vertically aligned rotational axis.

Each first blade has a blade edge 11, and each first blade has a maximal horizontal distance between the vertically aligned rotational axis and any point along the blade edge 11 of said first blade measured perpendicular to the vertically aligned rotational axis.

The second blade portion comprises a plurality of second blades, also called wide blades 18, which are substantially identical to one another and equally distributed about the rotational axis, wherein each second blade has a blade edge 23, and each second blade has a maximal horizontal distance between the rotation axis and any point along the blade edge 23 of said second blade measured perpendicular to the vertically aligned rotational axis.

The blades are fixed with respect to one another.

The number of first blades is equal to the number of second blades. In particular, in this embodiment, this number is equal to three.

The maximal horizontal distance for the second blade is at least about 1.5 times the maximal horizontal distance for the first blade.

This geometry is believed to be particularly beneficial as a wind turbine, and may be the object of patent protection per se.

In particular, in the present example, each narrow blade is aligned with a corresponding wide blade.

In particular, in the present example, the shell is constituted by an assembly of a plurality of identical blade components 28*c*. In the present example, the shell is constituted by three substantially identical blade components 28*c*. The number of blade components 28*c* is the same as the number of narrow blades and that of wide blades. Each blade component 28*c* comprises one single narrow blade 6 and one single wide blade 18.

The proximal portion 7 of each first blade comprises a fastening portion 65 for attachment to a neighbour first blade. This enables a lightweight yet strong assembly, enabling air to flow through the turbine between the blades at the central rotation axis, which is believed to be beneficial.

Figure 14:
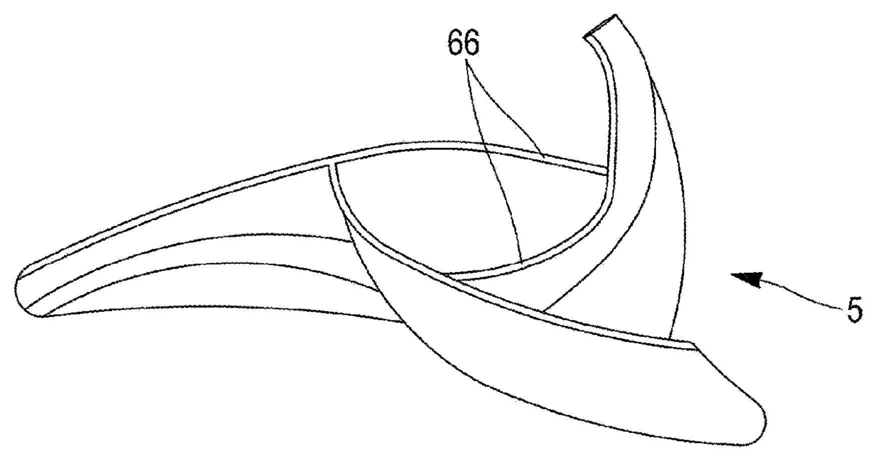
FIG. 14 is a top sectional view of the embodiment of FIG. 13.

The proximal portion 19 of the second blades comprises a fastening portion 66, such as for example a protruding tongue, extending within the neighbour second blade, so that all protruding tongues together surround a central space in housing-like manner, where the stator can be received, such as can be seen on FIG. 14.

Computer simulations were performed on the embodiment of FIG. 13, in order to evaluate the effect of the ionization on the production of electricity by the wind turbine.

The simulation involves a computer-assisted drawing (CAD) of the wind turbine, or at least of the rotor. Relevant parameters, such as the density and the electrical conductivity of the blade material is input. The simulation further features a mesh of the surrounding air. The mesh may be refined depending on the desired precision.

The air is modelled as dry, and at a temperature of 20° C. The chosen turbulence model is the k-ω shear stress transport. The intensity (K) of the turbulence form factor is chosen between about 1.8 and about 2. A Reynolds number typical of air flow in urban environments is chosen.

The locations of air ionization are defined. In the present simulation, there are twelve locations for air ionization. For example, the locations are at the edge of each blade (at the widest) and in the middle of each cavity (on the concave side). In each location, 600,000 ions are emitted per discharge.

The simulation takes into account fluid dynamics, coupling of fluid mechanics to solid mechanics, electrostatism, diffusion, convection and chemical recombination of the ions. Hence, the physical model uses the following principles:

the mass conservation equation, according to which the total mass of moving fluid remains constant, which can be written:

$$dp/dt+\nabla(\rho v)=0$$

the Navier-Stokes equations ruling the flow of air around the turbine, which can be written:

$$\rho(dv/dt+v.\nabla v)=-\nabla p+u\nabla^2 v+f$$

the conservation of species equation, which rules the transport and diffusion of ions in the air, and which can be written:

$$d(\rho Y_i)/dt+\nabla(\rho v Y_i)=\nabla(D_i \nabla Y_i)+Si$$

the Gauss's law, which enables to determine the electrical field, and can be written:

$$\nabla E=\rho_e \varepsilon_0$$

the perfect gas law, which can be written:

$$\rho=pM/RT.$$

Where ρ represents the air density, v represents the speed of air, t represents time, p represents the pressure, u represents the dynamic viscosity of air, f represents the external forces applied to the fluid (sum of gravity and electromagnetic forces), $Y_i$ represents the mass fraction of species i, $D_i$ represents the diffusion coefficient of the species i and $S_i$ represents the source of species i, E represents the electric field, $\rho_e$ represents the electrical charge density, $\varepsilon_0$ represents vacuum permittivity, M represents the molecular mass of air, R represents the perfect gas constant, T represents the temperature, d./dt represents the derivation operation with respect to time, and ∇ represents the divergence operator.

Complex couplings occur between these equations. For example, the electric charge density ($\rho_e$) in Gauss's law depends on the negative ion concentration (Yi), which is calculated by the conservation of species equation.

The blade-air interface is modelled as non-slip.

The air is defined flowing at a constant speed between about 2.5 meters per second (m/s) and about 22 m/s at the mesh upward limit (domain inlet), depending on the simulations. The density of the air is defined at about 1.23 kilograms per cubic meter (kg/m$^3$) at the domain inlet. A given pressure is defined at the domain outlet.

The simulation runs on a suitable solver, such as ANSYS Fluent, OpenFOAM or COMSOL Multiphysics. The results of the simulation may include the pressure distribution on the blades, the forces exerted on the blades, and the density distribution of the air. The simulation is run with and without the operating ionizers 52.

The result of the simulation show a local increase in air density up to about 1.8 kg/m$^3$, and an average density increase in the upstream volume of about 15%, for inlet wind speeds between about 5 and about 15 m/s, for the simulation run with the operating ionizers 52, compared to the simulation without the ionizers 52 operating.

Since the kinetic power $P_c$ of the incoming wind is defined as $P_c=\frac{1}{2}\rho\ S\ v^3$, where ρ is the average air density, S is the swept surface, and v the wind speed, the increase of incoming power is directly proportional to the increase in density.

According to an embodiment, the densifier 51 is not rotating, but static. For example, as shown on FIG. 11, the ionizer 52 is assembled to the stator 2. The electrical wires 58 may run along the vertical rotation axis, either upward or downward. The ends 57 of the electrical wires 58 or pins, comprising the electrodes, may be located at the central axis and ionize the air close to the blades. For example, above the electrical generator, a vertically extending hollow tube 67 may be assembled to the stator 2 and run in the space defined between the fastening portions of the blades. The electrical wires 58 run inside this tube. The electrical hollow tube may comprise through holes 68 at which the ends of the electrical wires 58 or pins are located. Even though, on FIG. 11, the effective ends 57 are shown extending from the tube 67, this is for illustrative reasons only. To allow rotation of the rotor, the effective ends 57 are flush with the tube 67.

In addition or alternative, electrical wires 58 may run along and inside the vertical mast 69 below the generator 29. The mast may comprise through holes at which the ends of the electrical wires 58 or pins are located. Another embodiment involves placing the ionizers 52 directly on the bottom face of the stator 2.

Figure 12:
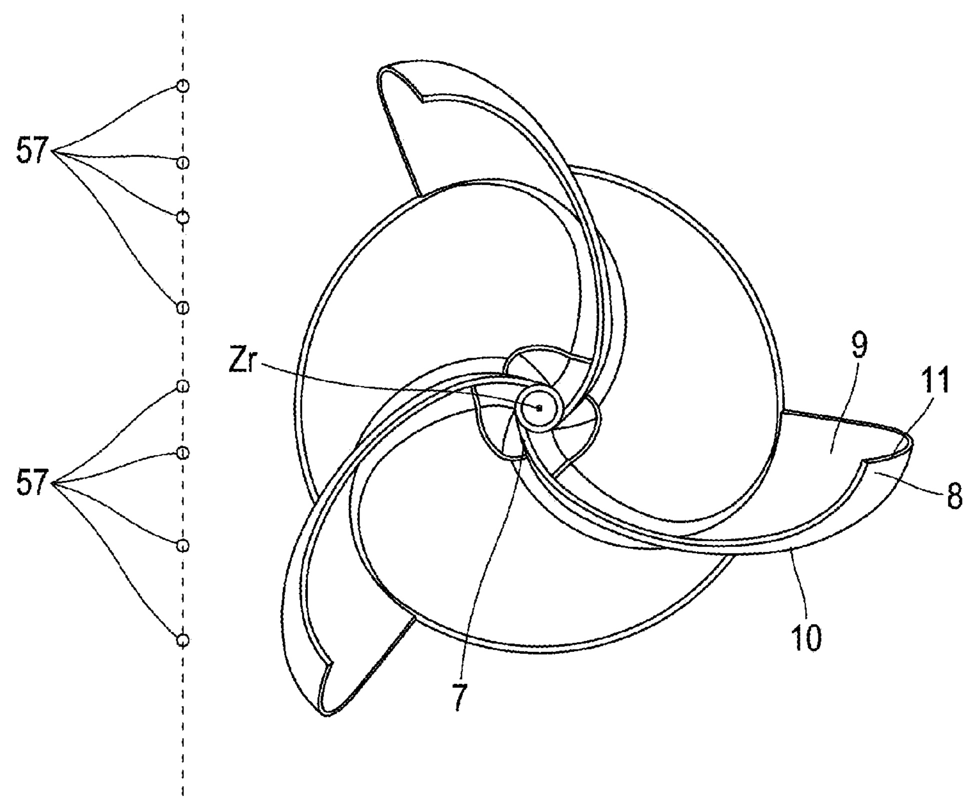
FIG. 12 corresponds to FIG. 4 for another embodiment.

According to another embodiment of a static densifier, such as shown on FIG. 12, the densifier 51 is not provided on the rotor 3, but upstream of the rotor 3. In this condition, the densifier 51 is provided fixed upstream of the turbine, so as to ionize air incoming on the turbine, so as to increase its density. For example, electrical wires run vertically upstream of the wind turbine, and bear one or more effective ends 57, and these electrical wires are connected to one or more electrical generators 54 (not shown). The maximal horizontal distance between the static densifier and the turbine may depend on the wind flow conditions.

Figure 7:
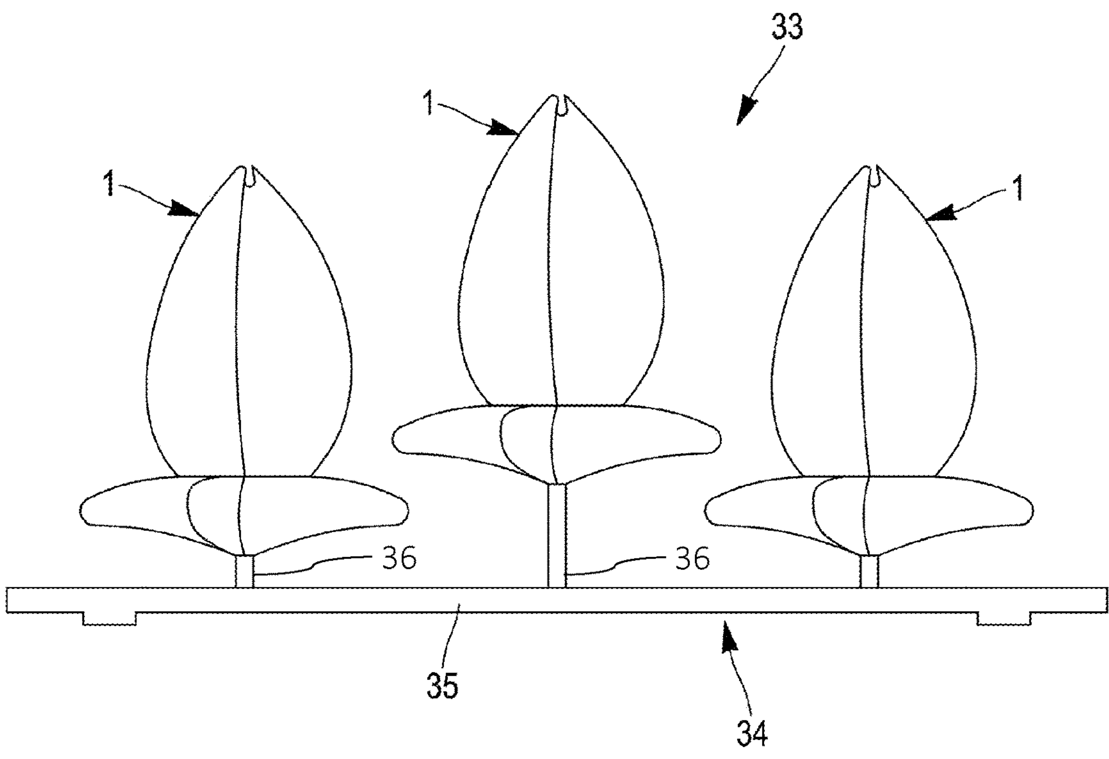
FIG. 7 is a perspective view of a first embodiment of an aerogenerator.

As can be seen on FIG. 7, according to one embodiment, an aerogenerator 33 comprises a plurality of wind turbines. For example, one, at least one, more than one or all of the wind turbines are wind turbines 1 according to the embodiment of FIGS. 13 and 14.

For example, the electrical generators 29 of one or more or all of the wind turbines of the aerogenerator 33 are each controlled independently from one another by their respective microcontroller 39. They are electrically connected to one another in parallel, so that the electrical current output by the aerogenerator 33 is the sum of the electrical currents generated by the individual wind turbines 1. This allows for example various wind turbines to rotate at different speeds (or even potentially some of them not rotating), due to the local flow of wind, screening effects, or any other reasons, and to adapt to ever-changing wind conditions.

The microcontroller 39 may implement an AI-based rule for the control of its individual wind turbine.

As shown on FIG. 7, the aerogenerator 33 comprises a structure 34 which carries the wind turbines 1. The structure 34 is designed to place the carried wind turbines 1 in space according to an arrangement which maximizes electrical energy output for incoming wind. For example, wind turbines are arranged so that screening between wind turbines is null or low. Screening relates to a part of a wind turbine being behind a part of another wind turbine along a direction of wind flow. Further, the wind turbines are arranged so that, taking into account a cylinder circumscribing the wind turbines together, along a direction of wind flow, the cross-section of this cylinder which is not intercepted by a wind turbine is minimal.

For example, the wind turbines 1 are offset from one another in at least two, possibly all three directions of space.

The structure 34 may for example comprise a base 35 and a plurality of poles 36 extending substantially vertically from the base 35, and a wind turbine 1 assembled to each pole 36. The wind turbine 1 may be assembled to a pole 36 by any suitable means. In particular, the generator stator 31 is assembled to the pole 36. Electrical wires (not shown), which deliver electrical energy from the wind turbine 1 may extend inside the inner lumen of the pole 36 to the base 35, which is assembled to an electrical cabinet.

This disclosure is applicable to either Savonius- or Darrieus-type vertical axis wind turbines.

Figure 15:
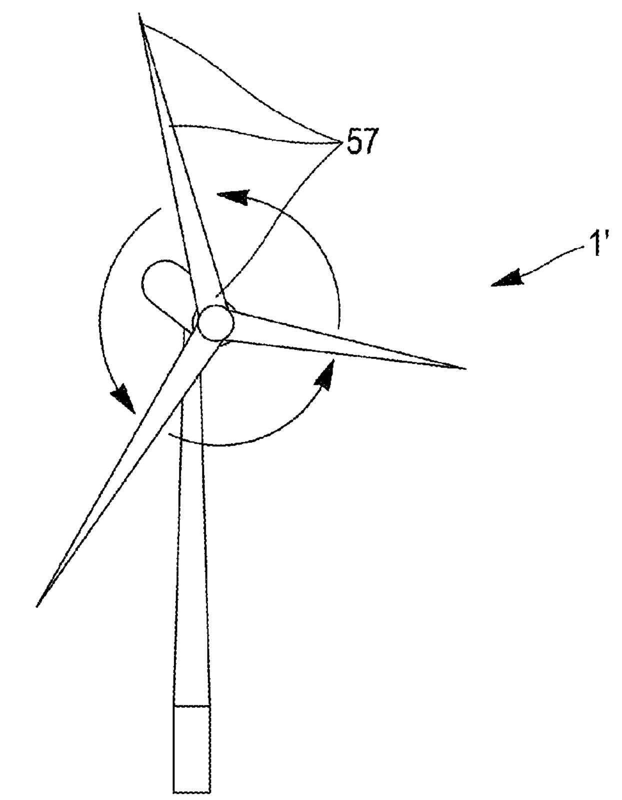
FIG. 15 is a perspective view of another embodiment.

According to yet another embodiment, as shown on FIG. 15, this disclosure may be applied to horizontal axis wind turbines 1'. The effective ends 57, corresponding to the ionization locations, may be located on the blade edge and/or around the hub (shown for one blade only on FIG. 15). The densifier is designed and parametered as appropriate for the application. This involves parameters such as the ones described above, notably the power applied to the ionizer(s), the emission voltage and/or the number and location of emission ends.

Figure 16:
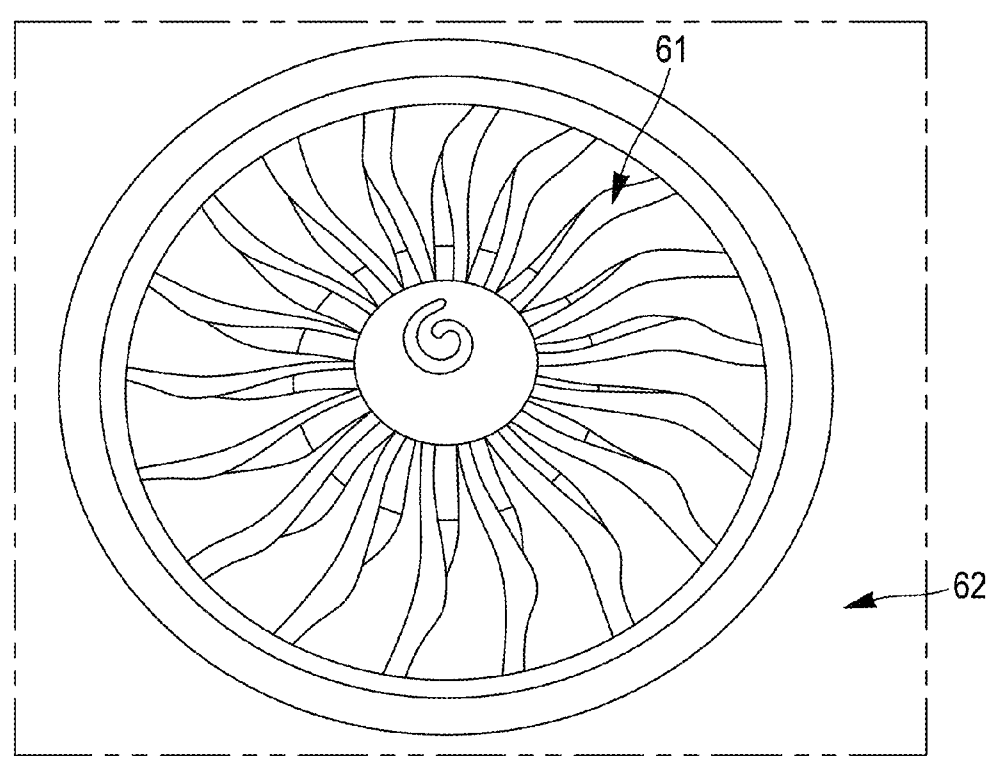
FIG. 16 is a perspective view of another embodiment.

According to another embodiment, this disclosure is applicable to other kinds of turbines than wind turbines. This disclosure is applicable when a flow of air passes through a rotor. For example, as shown on FIG. 16, the invention is applicable to a turbine 61 of a flying machine 62, such as a turbine of an airplane. This would allow the airplane to consume less energy for a given load, or carry a heavier load for a given energy consumption. This disclosure may also be applicable for flights at a very high altitude.

Figure 17:
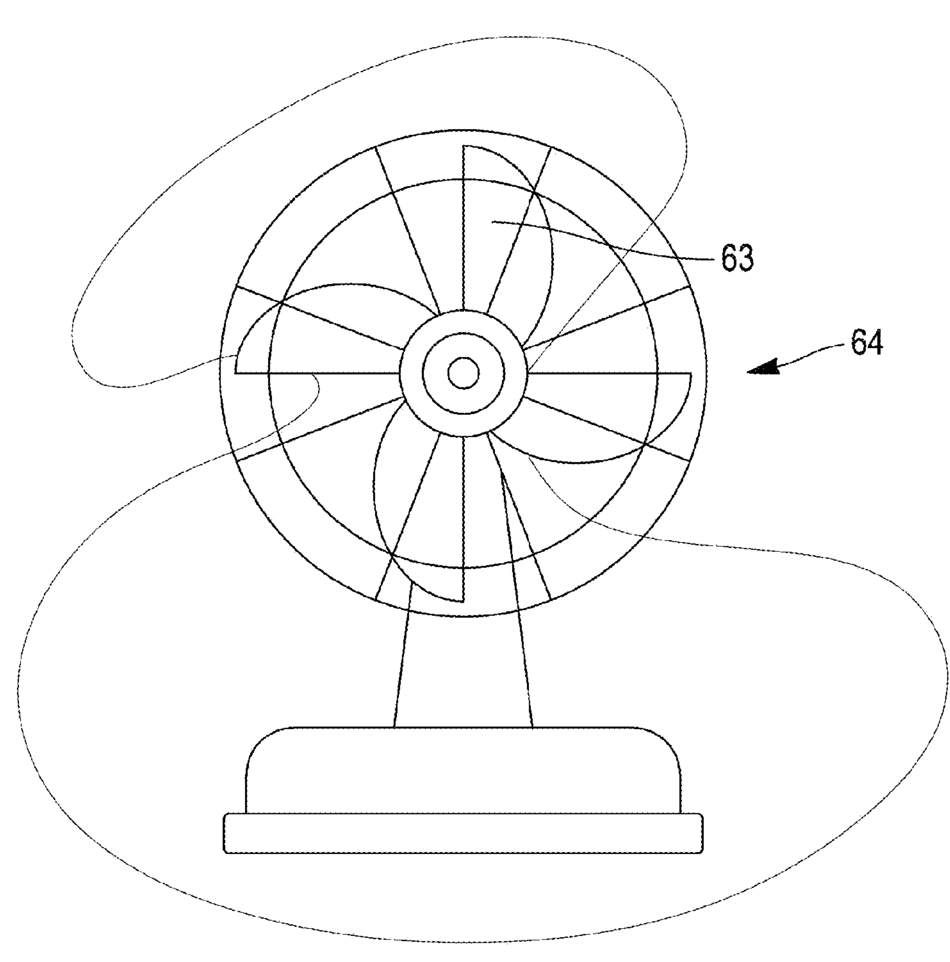
FIG. 17 is a schematic front view of another embodiment.

According to another embodiment, as shown on FIG. 17, this disclosure is applicable to a rotor 63 of an air fan 64, where mechanical movement of the rotor 63 is used to generate a flow of air through the rotor 63. This would allow the air fan to consume less energy to produce a given air flow, or to produce a more powerful air flow for a given energy consumption.

According to some embodiments, the rotor system is placed in a gaseous environment comprising a surrounding gas other than air. The densifier 51 is adapted to densify this gas.

REFERENCES

Wind turbine 1, 1'
Stator 2
Rotor 3
Narrow blade portion 4
Wide blade portion 5
Narrow blade 6
Proximal portion 7
Distal portion 8
Front face 9
Back face 10
Edge 11
Bottom portion 12
Top portion 13
Base 14
Top 15
Structure 16
Dome 17
Wide blade 18
Proximal portion 19
Distal portion 20
concave front face 21
convex back face 22
edge 23
bottom housing 24
bottom 25
upper opening 26
shell 27
blade components **28*a*, 28*b*, 28*c***
generator 29
generator rotor 30
generator stator 31
electronical circuit 32
aerogenerator 33
structure 34
foot base 35
pole 36
microprocessor 39
cavity 50
densifier 51
ionizer 52
electrical circuit 53
electrical generator 54
first electrode 55
second electrode 56
effective end 57
wire 58
connection line 59
dielectric material 60
turbine 61
flying machine 62
rotor 63
air fan 64
fastening portion 65
fastening portion 66
tube 67
through holes 68
mast 69

What is claimed is:

1. A rotor system for a wind turbine, comprising at least a rotor adapted to rotate with respect to a stator, the rotor system further comprising a densifier comprising at least one ionizer adapted to ionize air of an upstream volume so as to densify air of the upstream volume by an average density rise of at least 1%, wherein said upstream volume has a cross-section area which is a rotor sweeping area and a depth at least one millimeter, wherein the at least one ionizer comprises a processor adapted to determine a discharge frequency of the ionizer as a function of at least one wind flow parameter chosen among wind speed, wind direction, wind composition and wind turbulence, and wherein the at least one ionizer is adapted to generate discharges at said discharge frequency.

2. The rotor system of claim 1, wherein the at least one ionizer comprises at least one effective end located in the upstream volume.

3. The rotor system of claim 2, wherein said at least one effective end comprises at least a first electrode and a second electrode spaced apart from the first electrode, and wherein the ionizer comprises an electrical generator adapted to generate a voltage difference between the first electrode and the second electrode.

4. The rotor system of claim 2, wherein the at least one effective end is provided on the rotor.

5. The rotor system of claim 4, wherein the rotor comprises a plurality of blades, and wherein the at least one effective end is provided on one of said plurality of blades.

6. The rotor system according to claim 1, wherein the rotor is adapted to rotate with respect to the stator about a vertical axis.

7. The rotor system according to claim 1, wherein said average density rise is at least 10%.

8. The rotor system according to claim 1, wherein said depth is at least ten millimeters.

9. A turbine comprising a rotor system according to claim 1, and further comprising a stator.

10. A wind turbine system comprising the rotor system of claim 1.

11. The rotor system of claim 1, wherein the at least one wind flow parameter is measured at the wind turbine.

12. A rotor system comprising at least a rotor adapted to rotate with respect to a stator, the rotor system further comprising a densifier comprising at least one ionizer adapted to ionize air of an upstream volume so as to densify gas of the upstream volume by an average density rise of at least 1%, wherein a cross-section area of the volume is a rotor sweeping area and a depth of the volume is at least one millimeter, wherein the at least one ionizer comprises a processor adapted to determine a discharge frequency of the ionizer as a function of at least one wind flow parameter chosen among wind speed, wind direction, wind composition and wind turbulence, and wherein the at least one ionizer is adapted to generate discharges at the discharge frequency.

13. The rotor system according to claim 12, wherein the gas is air.

14. An airplane turbine comprising the rotor system of claim 12.

15. An air fan comprising the rotor system of claim 12.

* * * * *